Sept. 3, 1935.  I. H. WILSEY  2,012,981
HEATING DEVICE
Filed June 4, 1931
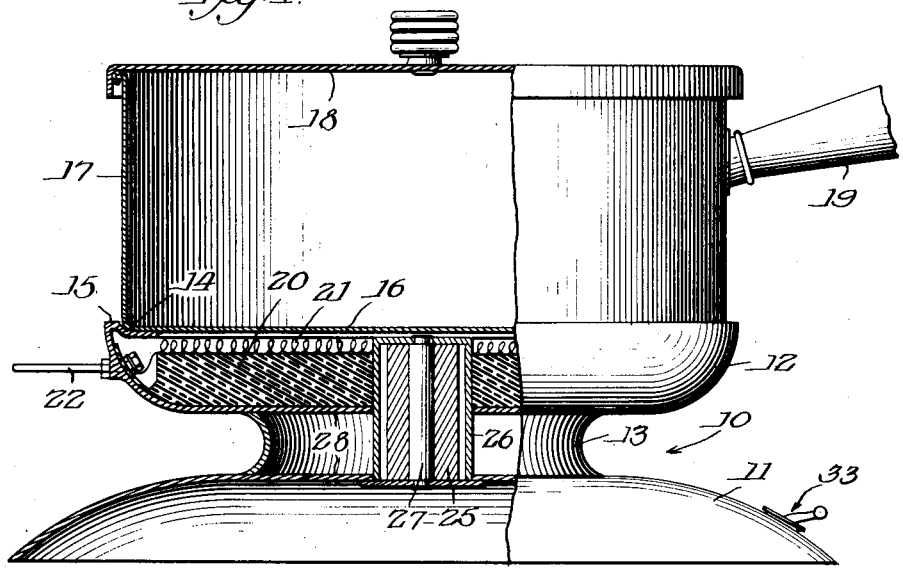
Inventor:
Irven H. Wilsey Patented Sept. 3, 1935

2,012,981

UNITED STATES PATENT OFFICE 2,012,981

HEATING DEVICE

Irven H. Wilsey, Chicago, Ill.

Application June 4, 1931, Serial No. 542,042

10 Claims. (Cl. 219—19)

The invention has reference to heating devices and more particularly to a device of this nature especially adapted for heating food-stuffs or the like and embodying means for agitating the material being heated.

The general object of the invention is to provide a device of this character capable of being employed as a simple heating device or readily adapted for use in connection with food-stuffs, such as pop corn, requiring rapid and thorough agitation during heating, which device is simple in structure and efficient in operation, is convenient and easy to clean, and may be manufactured and sold at a low cost.

An object of the invention is to provide a device of this character embodying new and improved means for agitating the material during heating.

Another object of the invention is to provide, in a device of this character, new and improved means for utilizing interrupted magnetic impulses to agitate the contents of a receptacle.

Another object is to provide, in a device of this character, an electrically-operated heating means and an electrically-operated agitating means, both of which means are connected to receive current from a common source, said agitating means being arranged so that the operating heat-loss thereof is utilized to heat the material.

More specifically stated, an object of the invention resides in the provision of a device for heating pop corn or the like which embodies a support having a heating element and an alternating current solenoid mounted thereon and connected in series, and a receptacle for pop corn or other material operatively associated with said support in such manner that the receptacle is heated while being subjected to the magnetic fluctuations induced in the solenoid by an interrupted or alternating current for vibrating or agitating the receptacle and also exposed to the heat emanating from the solenoid.

Other objects and advantages will become apparent in the following description and from the accompanying drawing, in which:

Figure 1 is an elevational view partially in vertical central section of a device embodying the features of the invention.

Fig. 2 is a wiring diagram of the electrical circuits.

While the present invention relates generally to devices for heating materials, it possesses inherent features which render the devices particularly advantageous for heating certain types of food-stuffs such as pop corn. For convenience in description, the device will be considered as being a corn popper.

Referring to the drawing, which for descriptive purposes disclose a preferred form of device, 10 indicates generally a support of any suitable form. In this instance, the support is a unitary structure of pleasing and ornamental appearance embodying a base 11, an upwardly opening dish-shaped housing 12 and a separating or spacing neck member 13. The housing 12 has an inturned marginal flange 14 which is centrally offset toward the base of the housing to provide an annular bead 15. A receptacle or material container, having a base 16 and side walls 17, is adapted to rest on the flange 14, the bead 15 serving to prevent accidental lateral displacement thereof from the support. A suitable cover 18 and handle 19 are generally provided for the receptacle.

Within the housing 12 is a block 20 of suitable insulating material having, on or in the upper surface thereof, an electrical heating element or unit 21. The preferred form of heating unit is a helical coil of material having a high coefficient of electrical resistance. Terminals 22, 23 of conventional form, project from the support for connecting the heating unit with a suitable source (not shown) of current.

The means for agitating the contents of the receptacle, as herein illustrated, comprises an electromagnet or solenoid of conventional construction embodying a winding 25, a casing 26 therefor and a fixed core 27. The solenoid is rigidly mounted in the support 10 in any suitable manner as by means of parallel walls 28 extending horizontally within the support. Preferably, the axis of the solenoid is substantially located on the axis of the support with the upper end of the solenoid disposed a short distance below the flat plane of the flange 14. Hence, when the receptacle is placed on the support, the bottom of the receptacle is spaced from the top of the solenoid a distance which subjects the receptacle bottom to the magnetic influence of the solenoid.

It is known that when an alternating current is passed through a solenoid, the current alterations produce rapid magnetic impulses. The effect of these impulses on an armature is to produce rapid vibrations thereof, or, as it is sometimes termed, causes "chattering". Consequently, by spacing the bottom of the receptacle, which, of course, is formed of a material responsive to a magnetic force, within the effective range of the solenoid and passing an alternating current through the solenoid, the receptacle bottom is caused to vibrate rapidly whereby agitation of the contents of the receptacle results. For example, when kernels of pop corn are placed in the receptacle, such rapid vibration of the bottom causes the kernels to move about and positively prevents burning thereof. Where only direct current is available, the same result may be obtained by providing well-known mechanism for rapidly interrupting the flow of said current.

With reference to Fig. 2, one preferred form of electrical circuit comprises the connection of the heating unit and the solenoid coil in series, with a switch controlled shunt circuit around the solenoid for rendering the solenoid substantially inactive. Thus, one terminal, in this instance the terminal 22, is connected by a lead 29, with one end of the solenoid coil 25. The other terminal 23 is connected with one end of the heating unit 21 by a lead 30 and a wire 31 connects the other ends of the coil and heating unit together. A wire 32 leading from the wire 31 around the coil 25 to the lead 29 provides a shunt circuit around the solenoid and includes a suitable switch 33 for controlling the shunt circuit. Preferably, this switch is mounted at some conveniently accessible point, as upon the base 11.

While, of course, the separate units may be satisfactorily connected in parallel or may be individually connected with a source of electric current, the illustrated circuit embodies an important advantage. Thus, the effective force of an energized solenoid depends directly, up to a certain limit, upon the number of its ampere turns, other factors being constant. The present organization provides the desired number of ampere turns by employing a coil having a relatively few number of turns of wire and connecting therewith, in series, a heating unit which is adapted to operate on a relatively high amperage and, when so connected, to draw the needed number of amperes to provide the predetermined and theoretically correct number of ampere turns. Of course, for any given size of wire, solenoids having a coil of few turns heat to a greater extent than a coil having a large number of turns, but in this instance, such heat loss is efficiently utilized by the disposition of the coil adjacent to the receptacle bottom so that such heat may amplify the effect of the heating unit. Similarly, any magnetic heat losses are recovered for heating purposes.

From the foregoing, it will be evident that a novel device has been provided which is simple in construction, cannot easily be damaged in use, is efficient in operation, and which may be manufactured and sold at a low cost. The device may be employed solely as a heater or stove by closing the switch 23 to complete the shunt circuit and is as readily changed to a heating device for imparting rapid, thorough and violent agitation to the contents of the container. Furthermore, all of the parts are readily accessible for inspection or repair and the device may be easily cleaned after use.

I claim as my invention:—

1. In a corn popper or the like, the combination of a receptacle for material to be heated, a support for said receptacle structurally separate from said receptacle to permit ready removal of the receptacle from said support and having means thereon to prevent lateral displacement of the receptacle therefrom, a heating unit in said support arranged adjacent to the bottom of the receptacle when the parts are assembled, a solenoid in said support disposed with its axis vertical in closely spaced relation to the central portion of the receptacle bottom to subject said bottom to the magnetic influence of the solenoid, and a circuit including said solenoid and said heating unit in series and arranged to be connected with a source of interrupted current whereby the magnetic fluctuations in said solenoid effect vertical vibration of the receptacle.

2. In a corn popper or the like, the combination of a receptacle for material to be heated, a support for said receptacle having means thereon to prevent lateral displacement of the receptacle therefrom, a heating unit in said support arranged adjacent to the bottom of the receptacle when the parts are assembled, a solenoid in said support disposed in closely spaced relation to the central portion of the receptacle bottom to subject said bottom to the magnetic influence of the solenoid, a circuit including said solenoid and said heating unit in series and arranged to be connected with a source of interrupted current whereby the magnetic fluctuations in said solenoid effect a vertical vibration of the receptacle, and a switch controlled shunt circuit around said solenoid whereby vibration of the receptacle may be optionally effected.

3. In a corn popper or the like, the combination of a receptacle, a support comprising an enlarged base portion, an upwardly facing dish-shaped portion provided with an inturned annular flange to support said receptacle, and a connecting neck, insulating material in said dish-shaped portion having a heating unit on the exposed face thereof, a solenoid extending axially through said neck and having one end thereof so disposed that the bottom of a supported receptacle is within the effective range of magnetic force of the solenoid, and means for connecting said solenoid and said heating unit with a source of interrupted current.

4. In a corn popper or the like, the combination of a receptacle, a support comprising an enlarged base portion, an upwardly facing dish-shaped portion provided with an inturned annular flange to support said receptacle, and a connecting neck, insulating material in said dish-shaped portion having a heating unit on the exposed face thereof, a solenoid extending axially through said neck and having one end thereof so disposed that the bottom of a supported receptacle is within the effective range of magnetic force of the solenoid, means for connecting said solenoid and said heating unit in series with a source of interrupted current, and a shunt circuit around said solenoid including a circuit controlling switch conveniently located on said support.

5. A device for effecting the heating and agitation of material in a container formed in part of a magnetic material, said device comprising a solenoid having a fixed core, a heating unit, leads connecting said solenoid and said unit in series, and terminals for connecting said device with a source of alternating current, said solenoid being separate from but disposed adjacent to said container to impart material agitating movement thereto by the magnetic impulses induced in said solenoid.

6. A circuit for effecting the heating and agitation of material in a container comprising a solenoid, a heating unit, leads connecting said solenoid and said unit in series, terminals for connecting said circuit with a source of alternating current, said solenoid being spaced from but disposed adjacent to said container to impart material agitating movement thereto by the magnetic impulses induced in said solenoid, and a shunt circuit around said solenoid having a circuit breaker therein whereby agitation of the material may be optionally effected.

7. In a corn popper or the like, the combination of a receptacle for material to be heated, a support on which said receptacle rests loosely, a heating unit in said support extending adjacent to the bottom of said receptacle when the parts are assembled, a solenoid in said support having one pole face thereof in closely spaced relation to the bottom of the receptacle to subject said receptacle to the magnetic influence of the solenoid and a circuit including said solenoid and a source of interrupted current.

8. A device of the character described comprising, in combination, a support, a structurally separate receptacle having a bottom wall in the form of a plate made of magnetic material and resting on said support, an electrical heating unit in the upper face of said support to heat said receptacle, an electromagnet in said support positioned centrally of said plate, and a source of interrupted current for energizing said electromagnet to intermittently draw said bottom wall toward said electromagnet.

9. A device of the character described comprising, in combination, a support, a receptacle having a bottom wall in the form of a plate made of magnetic material and resting at its periphery on said support, an electrical heating unit in said support to heat said receptacle, an electromagnet mounted in said support and positioned centrally of said plate with its upper end normally spaced a slight distance from said plate, and a source of interrupted current for intermittently energizing said electromagnet whereby said bottom wall will be caused to vibrate.

10. A device of the character described comprising, in combination, a receptacle having a flat bottom wall made of magnetic material, a support having an electrical heating unit in its upper face, an electromagnet mounted centrally in said support with its upper end positioned substantially at the upper face of said support, a source of interrupted current for intermittently energizing said electromagnet, and a peripheral flange on said support spaced slightly above the upper face thereof to support the periphery of said receptacle and hold the bottom wall of said receptacle spaced a short distance above the upper end of said electromagnet, the intermittent energization of said electromagnet causing said bottom wall to vibrate.

IRVEN H. WILSEY.